United States Patent
Lawler et al.

(10) Patent No.: US 11,405,342 B2
(45) Date of Patent: *Aug. 2, 2022

(54) SURFACING ATTACHMENTS IN EMAIL SEARCH SUGGESTION DROPDOWN

(71) Applicant: Microsoft Technology Licensing, LLC, Redmond, WA (US)

(72) Inventors: Rebecca Jean Lawler, Bellevue, WA (US); Joseph Patrick Masterson, Issaquah, WA (US); Hayley Lynn Steplyk, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/116,707

(22) Filed: Dec. 9, 2020

(65) Prior Publication Data

US 2021/0092084 A1 Mar. 25, 2021

Related U.S. Application Data

(63) Continuation of application No. 15/199,928, filed on Jun. 30, 2016, now Pat. No. 10,897,443.

(51) Int. Cl.
*H04L 51/08* (2022.01)
*H04L 51/04* (2022.01)
*G06F 16/93* (2019.01)
*H04L 51/00* (2022.01)

(52) U.S. Cl.
CPC .............. *H04L 51/12* (2013.01); *G06F 16/93* (2019.01); *H04L 51/04* (2013.01); *H04L 51/08* (2013.01)

(58) Field of Classification Search
CPC ......... H04L 51/04; H04L 51/08; H04L 51/12; G06F 16/93
See application file for complete search history.

(56) References Cited

U.S. PATENT DOCUMENTS

| | | | |
|---|---|---|---|
| 2006/0075046 A1* | 4/2006 | Yozell-Epstein | G06Q 10/107 709/206 |
| 2006/0089931 A1* | 4/2006 | Giacobbe | G06Q 10/107 |
| 2009/0177754 A1* | 7/2009 | Brezina | G06F 16/9535 709/206 |
| 2012/0226760 A1* | 9/2012 | Lewis | G06Q 10/107 709/206 |
| 2014/0087687 A1* | 3/2014 | Brezina | H04W 24/08 455/405 |

* cited by examiner

*Primary Examiner* — Soe Hlaing

(57) ABSTRACT

Presenting search suggestions within a messaging application that include attachments without searching messages for the attachments is provided. Messages are received at a computer and managed by a messaging application. A query for suggestions is received via the messaging application. The query is performed by the messaging application without querying the messages that have been received through the messaging application. Suggested search results are provided by the messaging application. The suggestions include attachments that were received via a message through the messaging application. In one or more aspects, the suggested search results also provide other attachments that were received by other than the messaging application.

20 Claims, 9 Drawing Sheets

SURFACING ATTACHMENTS IN EMAIL SEARCH SUGGESTION DROPDOWN

CROSS REFERENCE TO RELATED APPLICATIONS

This application is a continuation of U.S. application Ser. No. 15/199,928, filed Jun. 30, 2016, now U.S. Pat. No. 10,897,443, which is hereby incorporated by reference in its entirety herein.

BACKGROUND

Messaging applications provide tools for searching messages received or sent via the messaging application. Today users include a lot of attachments in their messages. Despite the search tools of the messaging application, the attachments are difficult to find because the search tools cannot search specifically for attachments. These known search tools are limited to searching only the messages that contain attachments. Also, these known search tools allow messages to be sorted based on whether a message includes an attachment. However, sorting for attachments does not help identify relevant attachments.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

According to one aspect disclosed herein, a computer-implemented method is presented for providing search suggestions within a messaging application that includes attachments without searching messages for the attachments. The method disclosed herein includes managing messages received through a messaging application and then receiving a query for suggestions via the messaging application. The messaging application then performs the query via the messaging application without querying the messages received through the messaging application. Suggested search results are provided via the messaging application including at least one attachment that has been received via a message through the messaging application. The suggested search results may also further include other attachments received at a computer by other than the messaging application in addition to attachments that has been received via messages through the messaging application.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
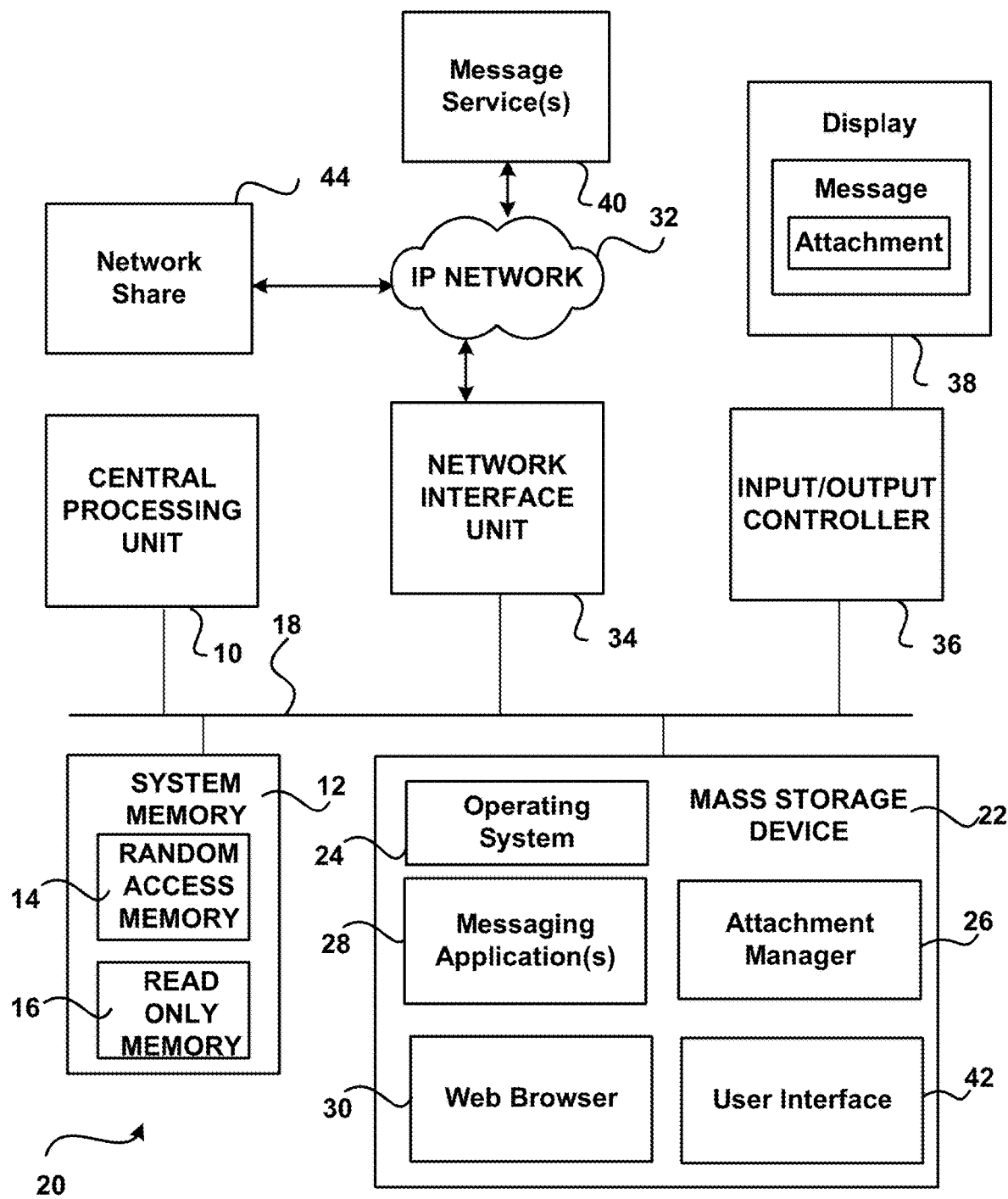
FIG. 1 illustrates an exemplary aspect of physical components for a computer environment utilized in the various aspects.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

FIG. 1 and the corresponding discussion are intended to provide a brief, general description of a suitable computing environment in which aspects may be implemented. Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Still referring to FIG. 1, an illustrative computer environment for a computer 20 utilized in the various aspects will be described. The computer environment shown in FIG. 1 includes computing devices that each may be configured as a mobile computing device (e.g. phone, tablet, net book, laptop), server, a desktop, or some other type of computing device and include a central processing unit 10 ("CPU"), a system memory 12, including a random access memory 14 ("RAM") and a read-only memory ("ROM") 16, and a system bus 18 that couples the memory to the CPU 10.

A basic input/output system containing the basic routines that help to transfer information between elements within the computer, such as during startup, is stored in the ROM 16. The computer 20 further includes a mass storage device 22 for storing an operating system 24, attachment manager 26, messaging application 28 and web browser 30.

The mass storage device 22 is connected to the CPU 10 through a mass storage controller (not shown) connected to the bus 18. The mass storage device 22 and its associated computer-readable media provide non-volatile storage for the computer 20. Although the description of computer-readable media contained herein refers to a mass storage device, such as a hard disk or CD-ROM drive, the computer-readable media can be any available media that can be accessed by the computer 20.

By way of example, and not limitation, By way of example, and not limitation, the term computer readable media as used herein include computer storage media. Computer storage media include volatile and nonvolatile, removable and non-removable media implemented in any method or technology for storage of information, such as computer readable instructions, data structures, or program modules. System memory, removable storage devices, and non-removable storage devices are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 20. According to an aspect, any such computer storage media is part of the computing device 20. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

Computer 20 operates in a networked environment using logical connections to remote computers through a network 32, such as the Internet. The computer 20 may connect to the network 32 through a network interface unit 34 connected to the bus 18. The network connection may be wireless and/or wired. The network interface unit 34 may also be utilized to connect to other types of networks and remote computer systems. The computer 20 may also include an input/output controller 36 for receiving and processing input from a number of other devices, including a keyboard, mouse, or electronic stylus (not shown). Similarly, the input/output controller 36 may provide input/output to a scanner, a camera, a display screen 38, a printer, or other type of input and/or output device. Display 38 is configured to display representations of the messages received via the messaging application 28.

As mentioned briefly above, a number of program modules and data files may be stored in the mass storage device 22 and RAM 14 of the computer 20, including an operating system 24 suitable for controlling the operation of a computer, such as the WINDOWS, WINDOWS MOBILE, or WINDOWS SERVER operating systems from MICROSOFT CORPORATION of Redmond, Wash. The mass storage device 22 and RAM 14 may also store one or more program modules. In particular, the mass storage device 22 and the RAM 14 may store one or more application programs, including one or messaging applications 28 and Web browser 30.

User interface 42 is used by a user to interact with applications and documents. Messaging application 28 may be one or more different messaging applications. For example, computing device 100 may include an email application, an Instant Messaging (IM) application, an SMS, MMS application, a real-time information network (e.g. Twitter® interface), a social networking application, and the like. According to an aspect, messaging application 28 is an email application, such as MICROSOFT OUTLOOK. The messaging application(s) may be client based and/or web based. For example, a network based message service 40 may be used or some other network based email and messaging service.

Network share 44 is configured to store content (e.g. documents, spreadsheet, images, video, Web content, and the like) that are accessible to one or more users through IP network 18. For example, network share 44 may store content that is accessible by users located at one or more locations.

Attachment manager 26 is configured to process attachments within messages and present the attachments to users. Attachment manager 26 may be located externally from an application, e.g. messaging application 28, as shown or may be a part of an application. Further, all/some of the functionality provided by attachment manager 26 may be located internally/externally from a messaging application.

Attachment manager 26 is configured to present links as attachments in an electronic message for easier access than having to locate the link within the body of the message. The term "link" refers to an address that represents a location of content. For example, a link may be in the form of a Uniform Resource Locator (URL) that specifies a network location of where the content is stored. Selecting the link generally retrieves the content that is pointed to by the link. The links may be to any type of content, such as word processing documents, spreadsheets, slides, images, video, websites and the like. The linked content may also be automatically downloaded such that the content is available offline.

Figure 2:
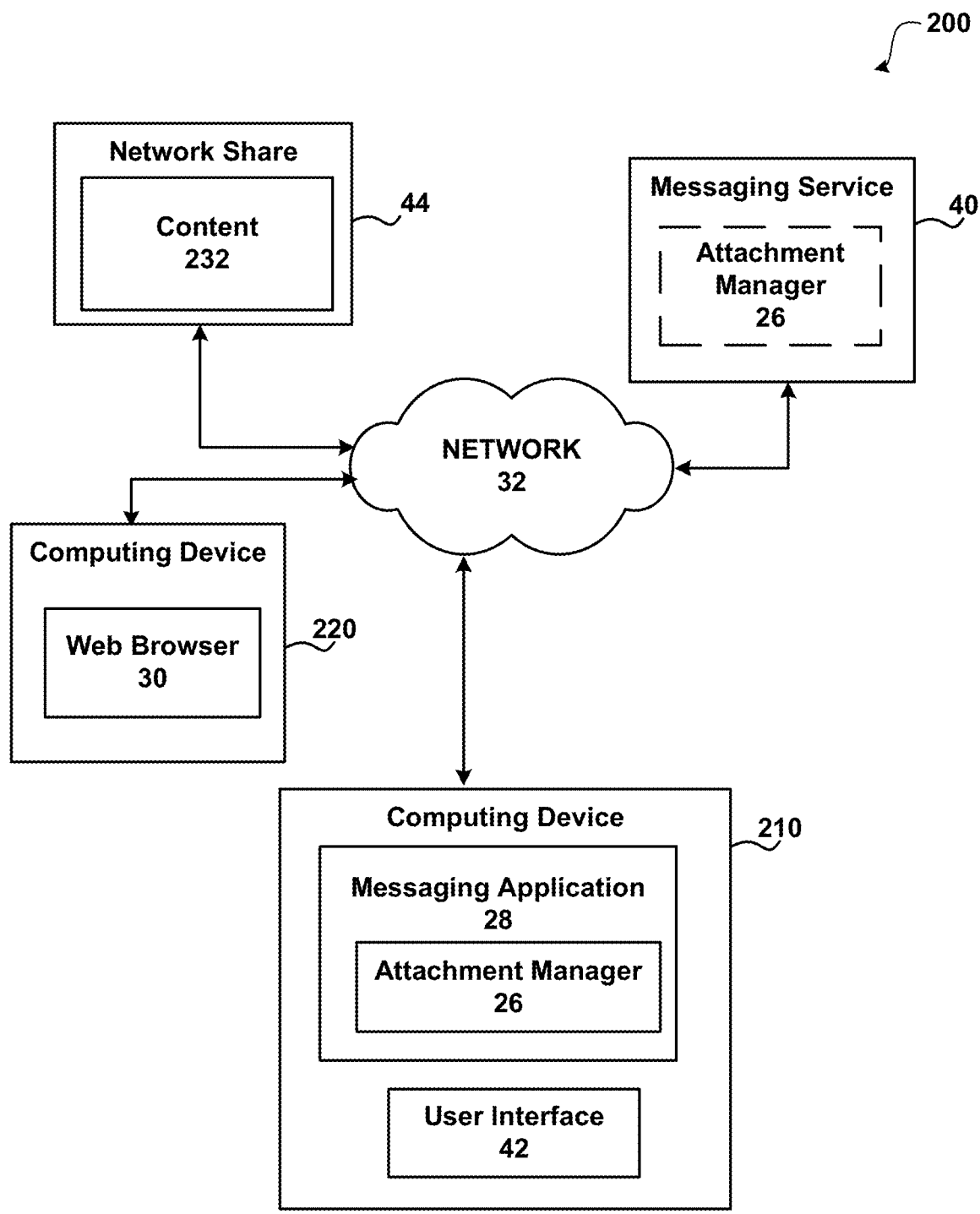
FIG. 2 illustrates an exemplary aspect of a system for communicating electronic messages with attachments.

FIG. 2 shows a system for presenting electronic messages where some of the electronic messages include attachments. System 200 includes computing device 210, computing device 220, network share 44 and messaging service 40. The computing devices 210, 220 may be any type of computing device that is configured to perform the operations relating to sending and receiving electronic messages that include attachments. The computing devices 210, 220 may be arranged to provide an online service (e.g. messaging service 40 that is configured for sending and receiving electronic messages). The computing devices 210, 220 may also be arranged as data shares, in local networks, in networks accessible through the Internet, and the like.

The computing devices 210, 220 are coupled through network 32 such as an IP network, a carrier network for cellular communications, and the like. Generally, network 32 is used to transmit data between computing devices, such as computing devices 210, 220, network share 44, and messaging service 40.

Computing device 210 includes messaging application 28 and user interface 42. As illustrated, computing device 210 is used by a user to interact with electronic messages, content in a network share (e.g. content 232) and the like.

User interface 42 is used to interact with an application and content, such as messaging application 28 and content 232. One or more items of the content 232 may become attachments to the electronic messages. One or more user interfaces of one or more types may be used to interact with the content. For example, user interface 42 may include the use of a context menu, a menu within a menu bar, a menu item selected from a ribbon user interface, a graphical menu, and the like. Generally, user interface 42 is configured such that a user may easily interact with content, attachments and electronic messages. For example, a user may simply select an option within user interface 42 that creates new electronic messages and select an attachment to include within an electronic message. Upon receipt of the electronic message, the user opens the message and opens the attachment.

Messaging application 28 may be a client based application, such as an email application, an instant messaging application, a social media application, and the like. Generally, messaging application 28 is used to send and receive electronic messages of one or more types. A network based messaging service 40 may be used in addition to messaging application 28 or instead of one or more of the different messaging applications. For example, a web interface may be used to access messaging service 40.

Messaging service 40 may be used to process electronic messages between one or more of the computing devices 210, 220. Messaging service 40 may be configured to process different message types, such as SMS, MMS, email, messages for social networks and the like. Messaging service 40 may be configured with the functionality of the attachment manager 26 and one or more message types may be used to communicate the electronic messages including the attachments.

Computing device 220 includes one or more applications, such as a web browser 30 that may be configured to access a messaging service, such as a web based email service and to interact with content. For example, a web browser may be used to access an electronic message through an email service and then access content 232 stored in network share 44.

Attachment manager 26 is configured to detect any attachments that are included with an electronic message. The attachments may be any type of content, such as word processing documents, spreadsheets, slides, images, video, website content and the like.

Figure 3:
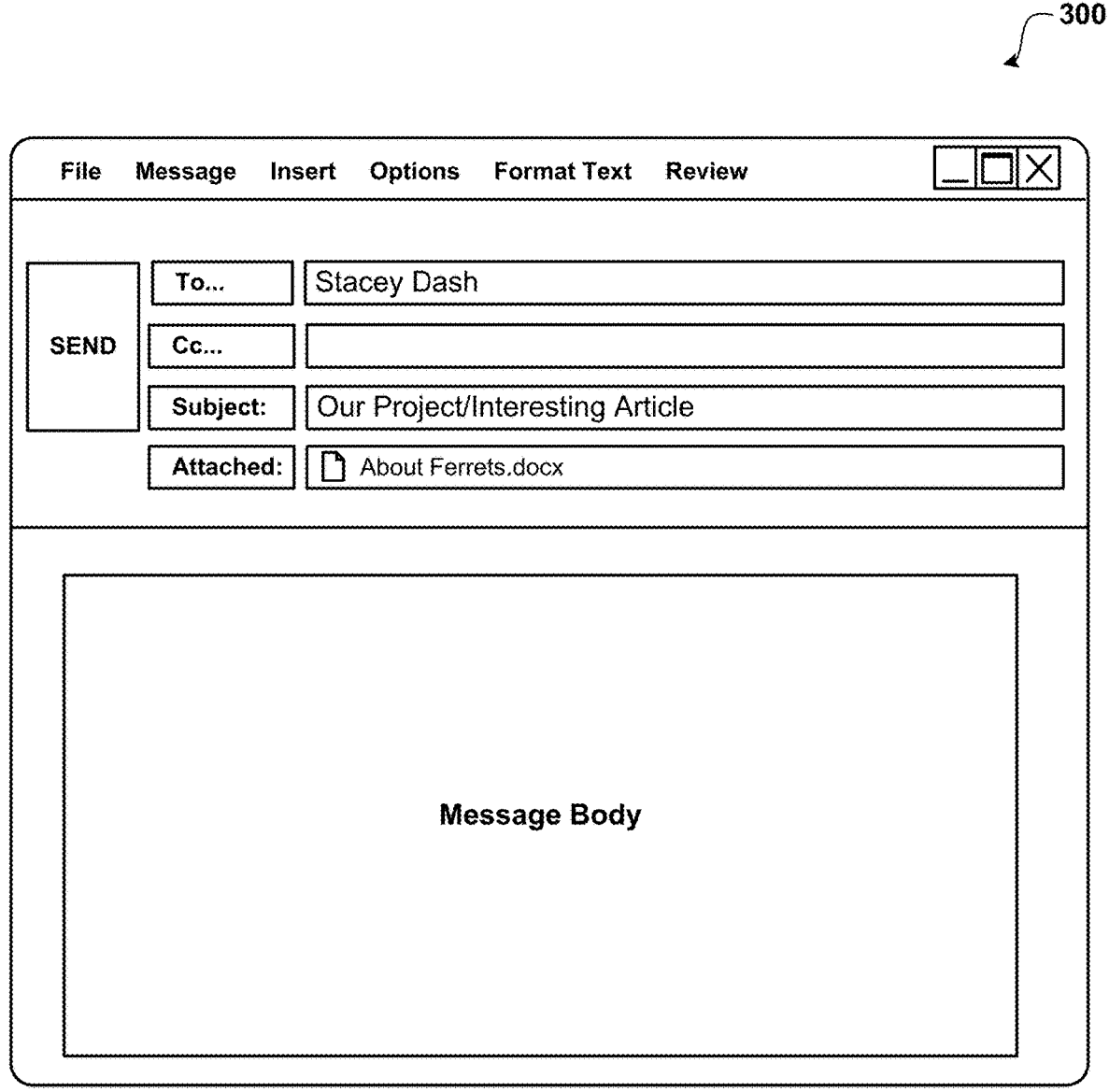
FIG. 3 illustrates an exemplary aspect of an electronic message received via the system of FIG. 2 wherein the electronic message includes an attachment.

FIG. 3 shows an electronic message 300 including an attachment. Message 300 includes To: field, a Cc: field, a Subject field:, an Attached field:, and a message body. More or fewer fields may be included with the electronic message 300. The electronic message 300 may be accessed a number of ways. For example, web browser 30 may access an electronic mail service, an email application on a computing device may be configured to receive emails from one or more different services, and the like.

Figure 4:
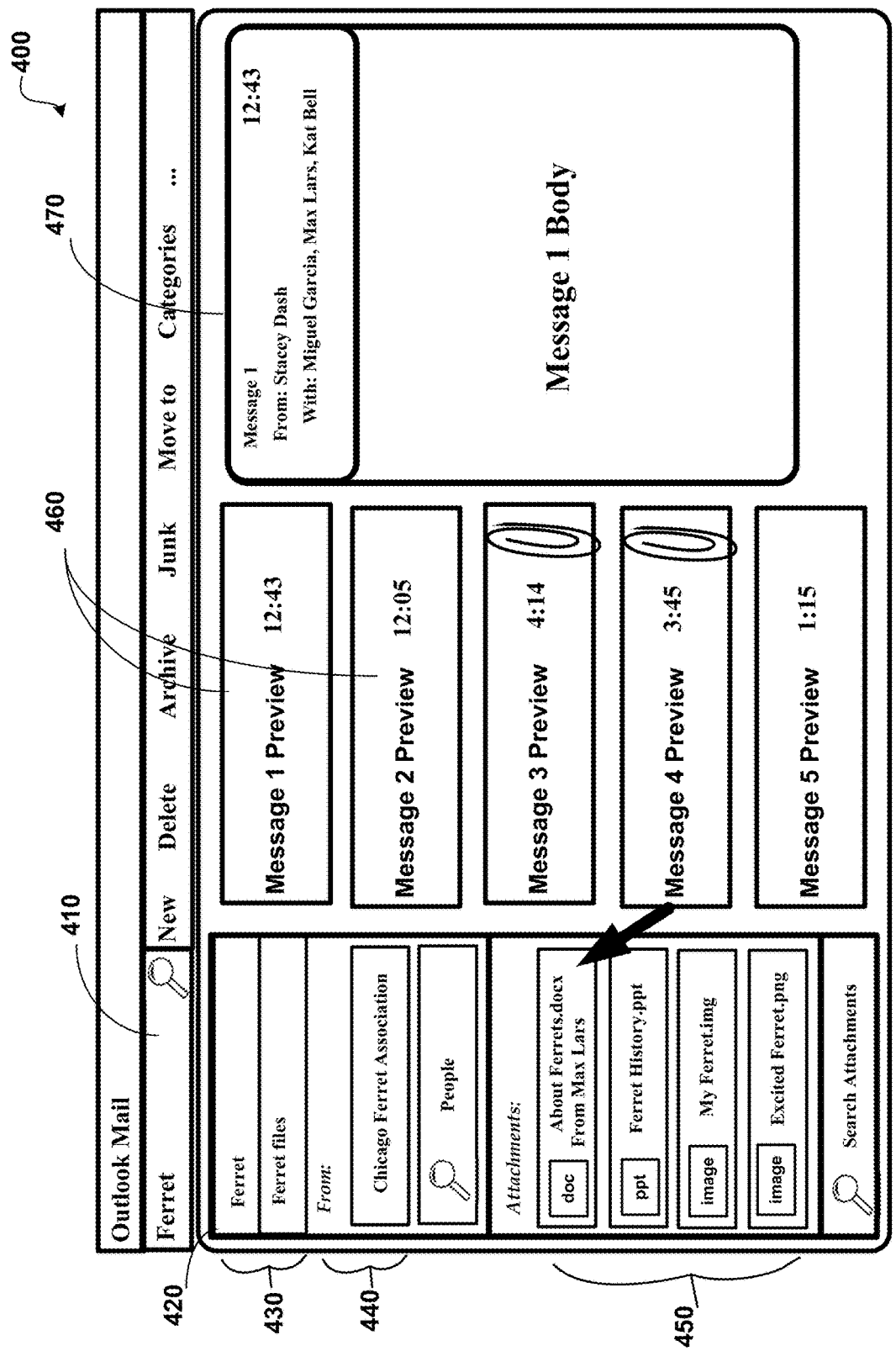
FIG. 4 illustrates a user interface of a messaging application providing suggested search results for a search query performed via the messaging application.

FIG. 4 illustrates one aspect of a user interface 400 of a messaging application such as messaging application 28. The example term "Ferret" is entered into a search field 410 and the search query is performed via the messaging application. Suggested search results 420 are provided that include other suggested search terms 430 for the search field 410 and suggested identification information 440 for another person, other people or entities that may be related to the search term "Ferret." Additional people on entities may also be searched for from the suggested search results 420. Thus, in response to a search query, the suggested search results 420 may include attachments, suggested search terms, and identification of another person or entity. Each suggested search result is selectable. However, messages associated with the information of the suggested search results including attachments are not required to be opened in order to perform the search query or to provide the suggested search results 420.

As shown in FIG. 4, the suggested search results 420 also include attachments 450. The attachments 450 are identified and provided via the attachment manager 26 to the suggested search results 420 of the message application 28. One or more of the attachments may have been received within a message through the messaging application 28. One or more other attachments may instead be from other than the messaging application 28 such as elsewhere in the computer 20 or from an external source over a network such as the Internet 32. The external source may be the messaging service 40. Additional attachments may also be searched for from the suggested search results 420.

In addition to the search results 420, the user interface 400 may also include message previews 460 of messages that are managed by the messaging application 28. Also, one or more messages such as message 470 may be opened as a result of being selected to be displayed via the user interface 400. Thus, the suggested search results 420 including attachments may be displayed alongside a preview of the messages that included the attachments when received through the messaging application 28 or may be displayed alongside the open messages that included the attachments when received through the messaging application 28.

Figure 5:
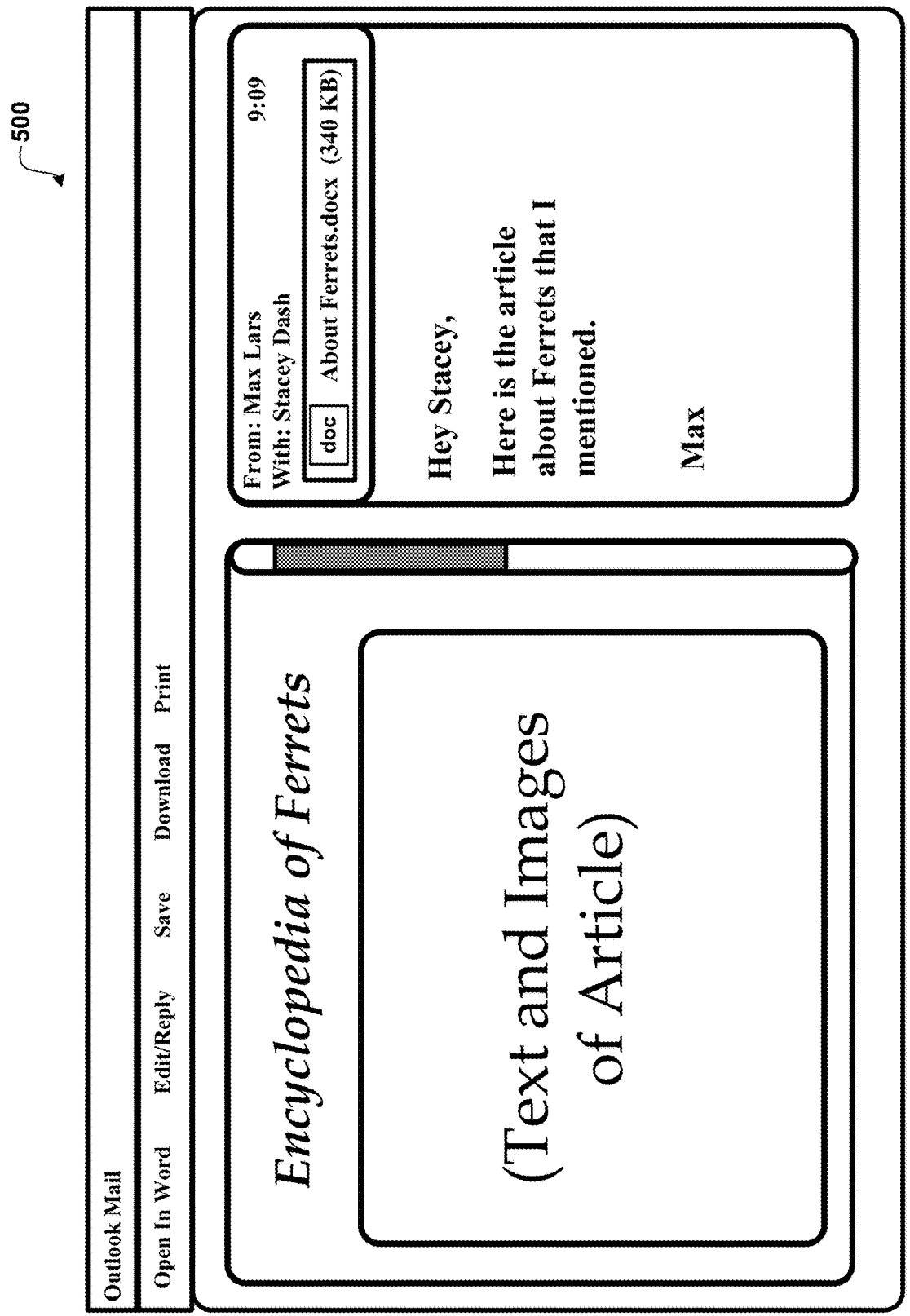
FIG. 5 illustrates a selected attachment opened from the suggested search results provided alongside the message that included the attachment.

FIG. 4 also illustrates an attachment being selected by a cursor that is a document having an example file name "About Ferrets.docs." In at least one aspect, selecting the attachment "About Ferrets.docs" results in opening the attachment in a user interface 500 such as depicted in FIG. 5. For example, the attachment may be opened by a word processing application on the computer 20 or by an online word processing application. Alternatively, the attachment may be opened in a file viewing application or an editing application such as POWERPOINT, EXCEL or another OFFICE application from MICROSOFT. Upon selecting and opening the attachment, the message that included the attachment when received by the messaging application 28 may also be displayed alongside or side-by-side the opened attachment in the user interface 500. However, in one or more aspects, the messages associated with the attachments selected from the suggested search results are not required to be opened in order to open the attachments.

Figure 6:
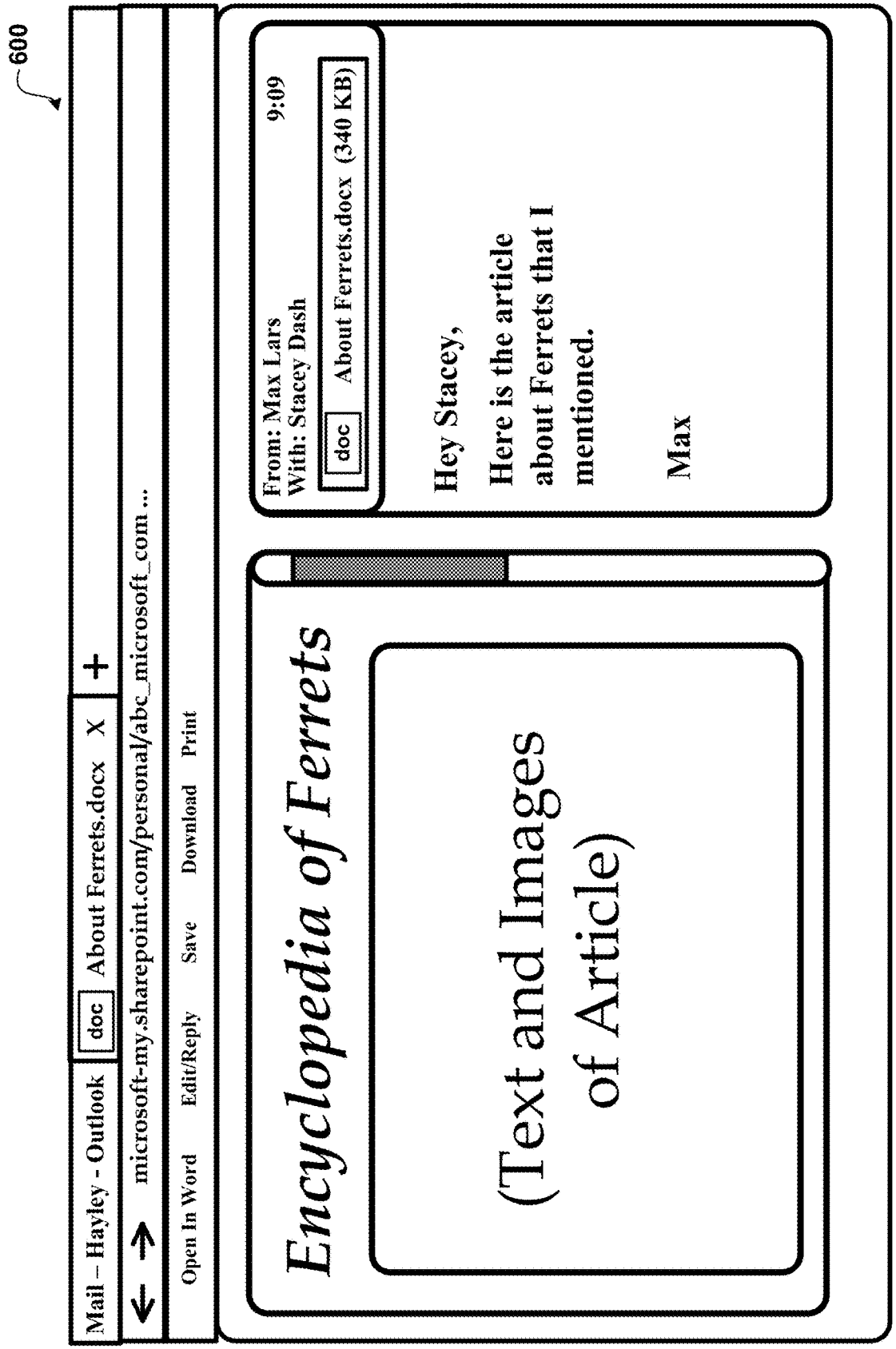
FIG. 6 illustrates selection of an attachment from the suggested search results resulting in the attachment being opened in an online word processing application and provided alongside the open message that included the attachment.

Alternatively, as shown in a user interface 600 of FIG. 6, selecting the attachment "About Ferrets.docs" results in the attachment being opened in an online word processing application. The attachment may be provided alongside the open message that originally included the attachment "About Ferrets.docs" when received by the messaging application 28.

Figure 7:
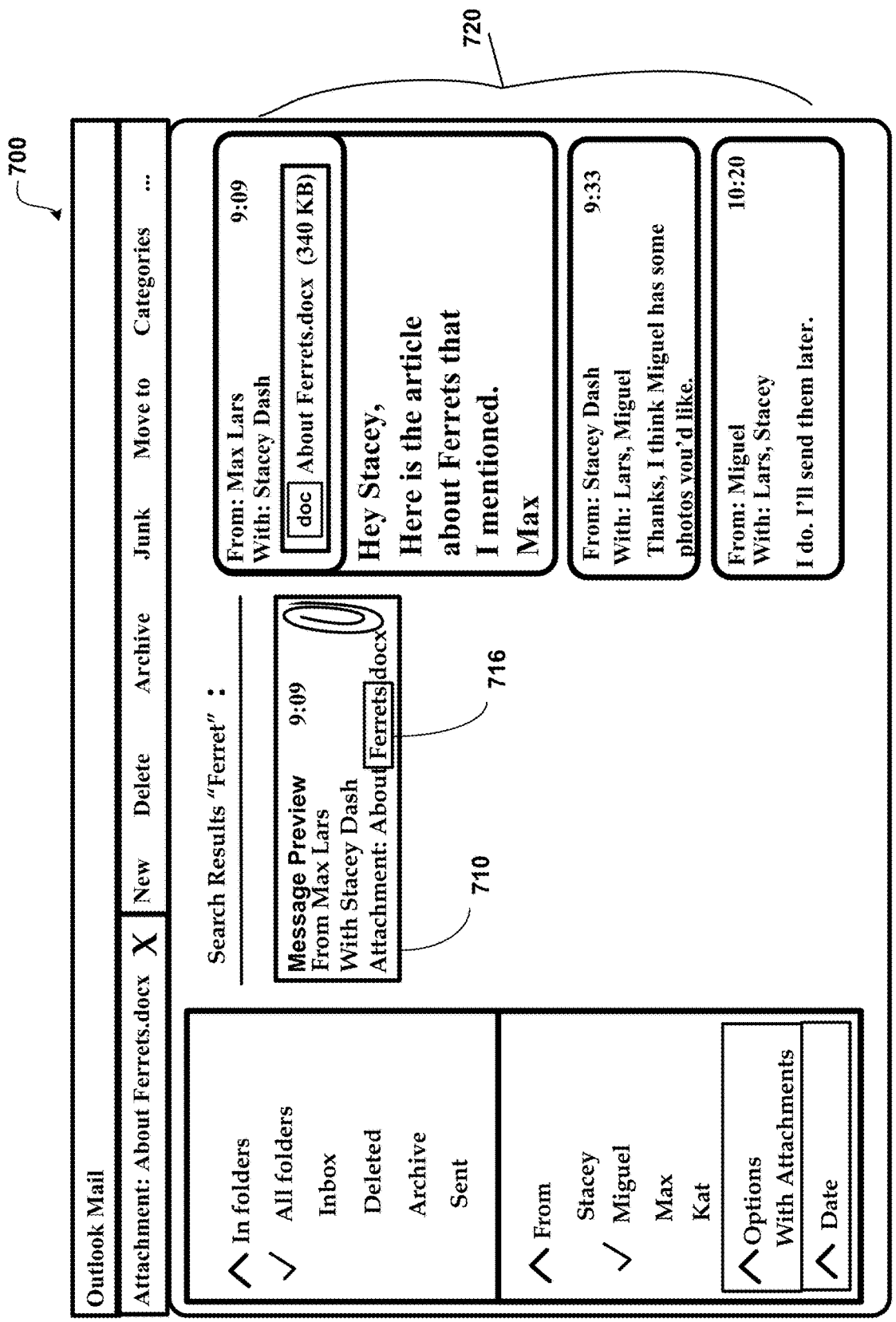
FIG. 7 illustrates selection of an attachment from the suggested search results resulting in a message preview of the message that was received with the attachment as well as a conversation of messages related to the attachment.

FIG. 7 illustrates another alternative implementation occurring as a result of selecting an attachment from the suggested search results. In one or more aspects, selecting an attachment from the suggested search results does not necessarily result in opening the attachment. The user interface 700 of FIG. 7 illustrates that the selection of an attachment from the suggested search results in providing a message preview 710. The message preview 710 corresponds with the original message that included the attachment, which in this case, is the attachment "About Ferrets.docs." The message preview 710 may include highlighting of the searched term. For example, the term "Ferret" was searched as best shown in FIG. 4 and, therefore, the term "Ferret" is highlighted in the file name of the attachment in the message preview 710. The highlighting of the term "Ferret" in the message preview 710 is indicated by the reference number 716.

Selecting an attachment from the suggested search results also may result in displaying a conversation 720 of messages related to the attachment. For example, the conversation 720 includes a chain of messages. The chain of messages includes the message that included the attachment "About Ferrets.docs" when received by the messaging application 28 as well as two other messages received in response to the original message with the attachment "About Ferrets.docs." The two additional messages are associated with the message that included the selected attachment because they were submitted in response to the message with the attachment. One or more of the messages included in the conversation may be opened to display the message body. In FIG. 7, the message with the attachment "About Ferrets.docs" is open. The user interface 700, as well as one or more of the other user interfaces disclosed herein, may also include additional search parameters or filters which may be selected for refining the suggested search results.

Figure 8:
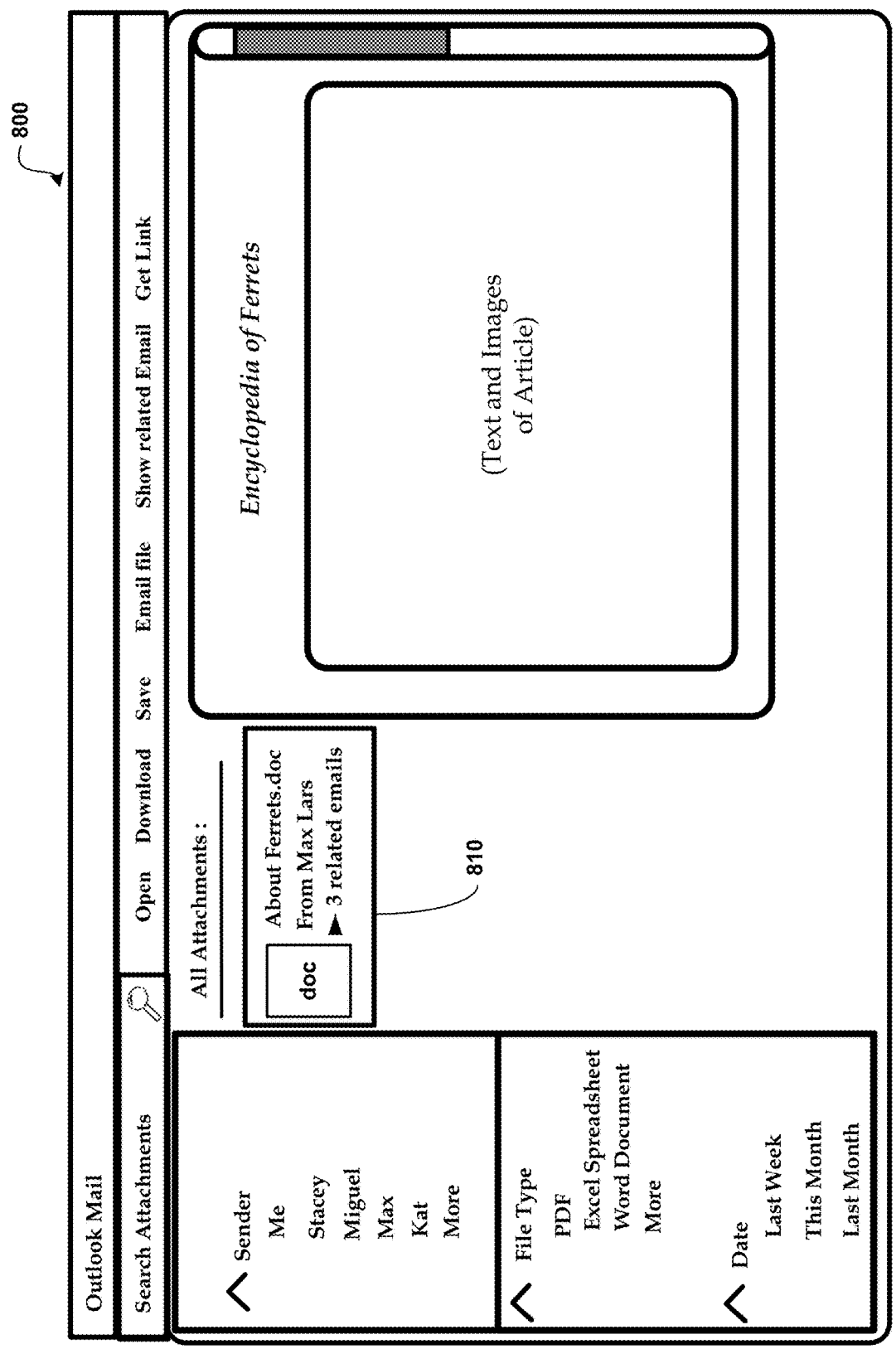
FIG. 8 illustrates selection of an attachment from the suggested search results resulting in presentation of filter criteria and the attachment opened in an example word processing application.

FIG. 8 illustrates a user interface 800 where selection of a suggested attachment from the suggested search results opens the suggested attachment in a word processing application and provides a summary information operation 810. The summary information operation 810 may indicate the sender of the messaging having the selected attachment as well as the number of other related messages that are part of the conversation. As best shown in FIG. 8, opening a selected attachment from the suggested search results does not require that the associated message that included the attachment also be opened.

Figure 9:
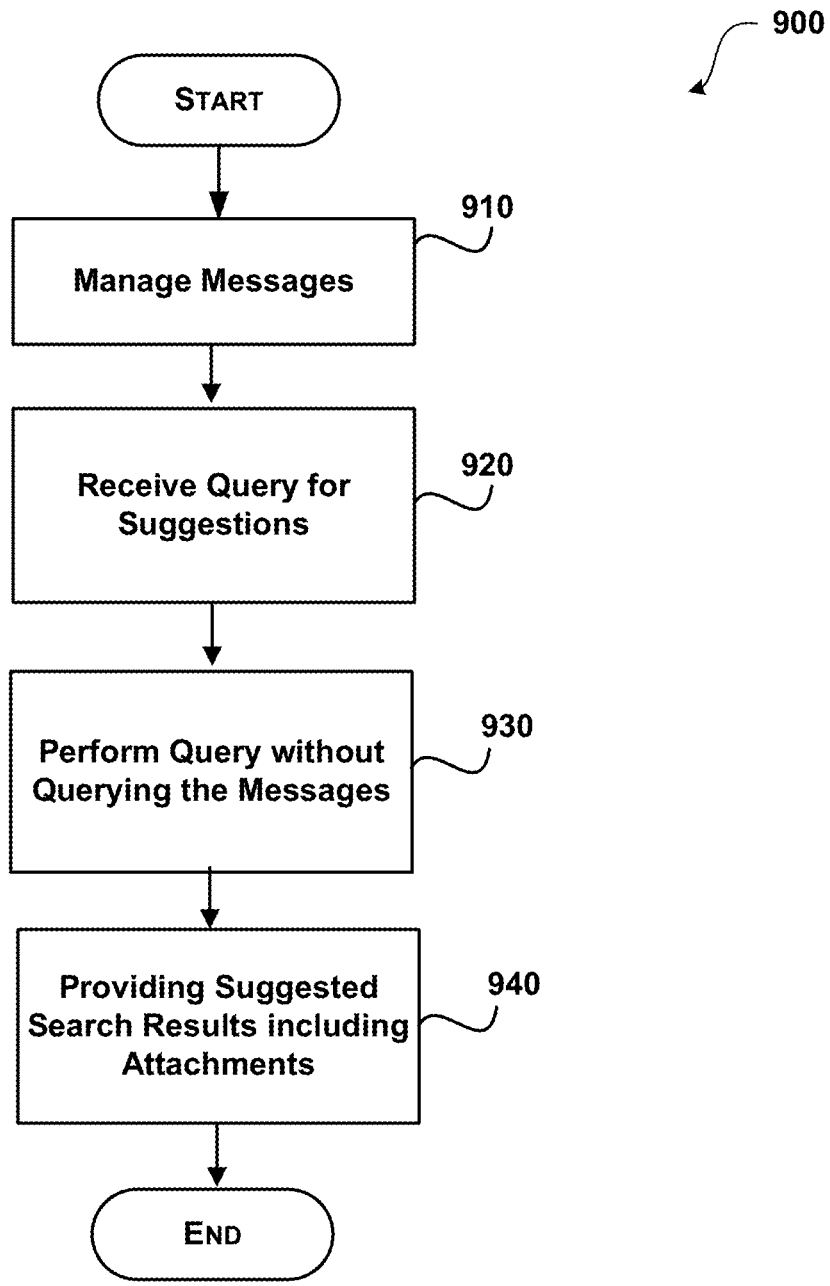
FIG. 9 illustrates a flowchart showing general stages involved in presenting suggested search results via the messaging application without querying messages of the messaging application.

FIG. 9 illustrates one aspect of a process 900 for presenting search suggestions within a messaging application that include attachments without searching messages themselves for the attachments. When reading the discussion of the routines presented herein, it should be appreciated that the logical operations of various aspects are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the aspects described herein are referred to variously as operations, structural devices, acts or modules. These operations, structural devices, acts and modules may be implemented in software, in firmware, in special purpose digital logic, and any combination thereof.

After a start operation, the process 900 moves to process operation 910 for managing the messages received through a messaging application. At process operation 920 the messaging application receives a query for suggestions from a user where the query is submitted by the user via the messaging application. The process 900 continues to process operation 930 for performing the query via the messaging application without querying the messages received through the messaging application. At process operation 940 the process continues by providing suggested search results via the messaging application where the suggested search results include at least one attachment that had been received via a message through the messaging application. Process 900 then flows to an end operation to exit. The process 900 may also include the suggested search results providing at least one other attachment received at a computer by other than the messaging application in addition to the at least one attachment that had been received via the message through the messaging application.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

What is claimed is:

1. A method for presenting search suggestions within a messaging application, comprising:
   receiving a query via a search field of a user interface of a messaging application that is configured to manage a plurality of messages;
   performing the query via the messaging application to identify an attachment to one of the plurality of messages responsive to the query;
   providing, for display in a search results window of the user interface, search results including the attachment identified by the query, the attachment having been received at the messaging application via from the one of the plurality of messages;
   receiving a selection of the attachment from the search results displayed in the search results window; and
   in response to receiving the selection of the attachment and without opening or displaying the message, opening an instance of an associated application within the user interface configured to allow editing of the attachment to provide content of the attachment alongside content of the message for co-display within the user interface.

2. The method of claim 1, wherein performing the query comprises performing the query to identify the attachment without querying the plurality of messages received through the messaging application.

3. The method of claim 1, wherein providing the attachment for display in the search results window comprises providing the attachment for display without opening or displaying the message via which the attachment was received at the messaging application.

4. The method of claim 1, wherein performing the query comprises performing the query to further identify and provide for display as part of the search results at least one of a suggested search term responsive to the query or identification for another person or entity responsive to the query.

5. The method of claim 1, wherein the search results further include another attachment identified by the query, the other attachment having been received at a computer by an application other than the messaging application or from an external source over a network.

6. The method of claim 1, further comprising opening the attachment in response to receiving the selection of the attachment to provide the attachment for co-display.

7. The method of claim 6, wherein opening the attachment comprises opening an instance of an associated application for the attachment within the user interface to display the attachment.

8. The method of claim 7, further comprising enabling editing of the attachment within the instance of the associated application.

9. The method of claim 6, wherein opening the attachment comprises opening a web-based application for the attachment.

10. A method for presenting search suggestions within a messaging application, comprising:
   receiving a query via a search field of a user interface of a messaging application that is configured to manage a plurality of messages;
   performing the query via the messaging application to identify an attachment to one of the plurality of messages responsive to the query;
   providing, for display in a search results window of the user interface, search results including the attachment identified by the query, the attachment having been received at the messaging application via from the one of the plurality of messages;
   receiving a selection of the attachment from the search results displayed in the search results window; and
   in response to receiving the selection of the attachment and without opening or displaying the message, opening an instance of an associated application within the user interface configured to allow editing of the attachment to provide a preview of the message for display within the user interface along with content of the attachment, the preview including an indication of the attachment, providing less than the full content of the attachment, and visually emphasizing a portion of the attachment responsive to the query.

11. The method of claim 10, wherein providing the preview of the message comprises providing the preview of the message for display within a first pane of the user interface.

12. The method of claim 11, further comprising:
   providing the message in a second pane of the user interface for co-display with the preview of the message.

13. The method of claim 12, further comprising:
   providing the message concurrently with one or more other messages from the plurality of messages associated with a same conversation in the second pane of the user interface.

14. The method of claim 10, wherein at least a portion of a filename of the attachment is highlighted to visually emphasize the portion of the attachment responsive to the query.

15. The method of claim 10, wherein performing the query comprises performing the query to identify the attachment without querying the plurality of messages received through the messaging application.

16. The method of claim 10, wherein providing the attachment for display in the search results window comprises providing the attachment for display without opening or displaying the message via which the attachment was received at the messaging application.

17. A method for presenting search suggestions within a messaging application, comprising:
   managing a plurality of messages received through a messaging application;
   receiving a query via a search field of a user interface of the messaging application;
   performing the query via the messaging application to identify an attachment responsive to the query;
   providing, for display in a search results window of the user interface, search results including the attachment identified by the query, the attachment having been received at the messaging application via a message from the plurality of messages;
   receiving a selection of the attachment from the search results displayed in the search results window; and
   in response to receiving the selection of the attachment and without opening or displaying the message:
      opening an instance of an associated application for the attachment within the user interface to display the attachment, the associated application enabling editing of the attachment; and
      providing, in the user interface, content of the attachment, the message, and summary information associated with the message.

18. The method of claim 17, wherein providing the summary information associated with the message includes providing at least one of a sender of the message or a number of other messages from the plurality of messages associated with a same conversation as the message.

19. The method of claim 17, wherein performing the query comprises performing the query to identify the attachment without querying the plurality of messages received through the messaging application.

20. The method of claim 17, wherein providing the attachment for display in the search results window comprises providing the attachment for display without opening or displaying the message via which the attachment was received at the messaging application.

* * * * *